United States Patent [19]

Wallace et al.

[11] Patent Number: 4,858,949
[45] Date of Patent: Aug. 22, 1989

[54] LIGHTWEIGHT TRAILING ARM SUSPENSION

[75] Inventors: Donovan B. Wallace; William C. Pierce, both of Muskegon, Mich.

[73] Assignee: Lear Siegler Neway Corp., Muskegon, Mich.

[21] Appl. No.: 123,582

[22] Filed: Nov. 20, 1987

[51] Int. Cl.⁴ .............................................. B60G 9/02
[52] U.S. Cl. .................................................. 280/713
[58] Field of Search ............... 280/683, 685, 687, 711, 280/713, 724, 725, 726

[56] References Cited

U.S. PATENT DOCUMENTS

| | | | |
|---|---|---|---|
| 1,130,656 | 3/1915 | Annable | 267/64.23 |
| 2,742,301 | 4/1956 | Pointer | 280/683 |
| 2,820,647 | 1/1958 | Jackson | 280/124 |
| 2,874,647 | 2/1959 | Candlin, Jr. | 105/171 |
| 2,901,241 | 8/1959 | Lautzenhiser et al. | 280/714 |
| 2,902,291 | 9/1959 | Walker | 280/711 |
| 2,903,256 | 9/1959 | Weiss | 267/15 |
| 2,913,252 | 11/1959 | Norrie | 280/713 |
| 2,970,848 | 2/1961 | Rice | 280/711 |
| 2,999,682 | 9/1961 | Stump | 267/65 |
| 3,063,732 | 11/1962 | Harbers et al. | 280/124 |
| 3,081,075 | 3/1963 | Selman | 280/711 |
| 3,547,215 | 12/1970 | Bird | 280/713 |
| 3,801,086 | 4/1974 | Raidel | 267/67 |
| 4,465,298 | 8/1984 | Raidel, Sr. | 280/713 |
| 4,615,539 | 10/1986 | Pierce | 280/713 |
| 4,630,541 | 12/1971 | Carlson et al. | 280/713 |
| 4,693,486 | 9/1987 | Pierce et al. | 280/713 |

FOREIGN PATENT DOCUMENTS

2204385  8/1973  Fed. Rep. of Germany ...... 280/713

Primary Examiner—Charles A. Marmor
Assistant Examiner—R. Weaver
Attorney, Agent, or Firm—Varnum, Riddering, Schmidt & Howlett

[57] ABSTRACT

A lightweight trailing arm suspension comprises a frame bracket assembly (18), a trailing arm (16) and an air spring assembly (22) formed of a fixed cup (64) with a movable piston (66) mounted in lateral juxtaposed relationship to a terminal end of the trailing arm assembly (56). A clamping assembly (28) affixes the trailing arm to the axle (24), thus suspending the ground engaging wheels (14). A wear pad (60) interposed between a portion of the clamping assembly (28) and the trailing arm (16) resists the torsional moment of the trailing arm to provide stability and minimize wear. The cup (64) is hollow and communicates with the interior of an air spring (72) to provide a reservoir therefor. A track bar (115) with bushed joints at both ends interconnects the frame (10) and the axle housing (26) to provide lateral stability.

32 Claims, 9 Drawing Sheets

LIGHTWEIGHT TRAILING ARM SUSPENSION

BACKGROUND OF THE INVENTION

1. Field of the Invention

This invention relates to vehicle suspension systems for wheeled vehicles. In one of its aspects, the invention relates to a lightweight, yet rigid, trailing arm suspension for vehicles wherein the trailing arm is positioned alongside the frame and the air spring is positioned beneath the frame.

2. State of the Prior Art

Heavy-duty vehicle suspension systems are typically characterized by high-strength components which are relatively heavy. It is desirable to reduce the weight of the suspensions without loss of strength. The lower the vehicle weight, the more load the vehicle can carry or the lower the fuel cost.

Trailing arm suspensions are well known. The suspensions comprise a frame bracket which is secured to the frame of the vehicle, a trailing arm, which is usually a rigid beam, pivotably mounted at one end to the frame bracket and having an air spring mounted between the other end and the frame. An axle is mounted midway between the ends of the trailing arm.

Bird, in U.S. Pat. No. 3,547,215, issued Dec. 15, 1970, discloses a trailing arm suspension in which a square axle is mounted beneath a trailing arm through bolted upper and lower axle brackets. The axle brackets are secured to the trailing arm through rubber bushed pin connections. Shims can be provided between the bushed pins and the upper axle brackets to adjust the pinion angle of the axle. The trailing arm is mounted between the vehicle frame and the wheels, but the air spring is mounted beneath the frame, offset laterally from the longitudinal axis of the trailing arm on a crossbeam which extends between trailing arms on each side of the vehicle. The cross-beam counterbalances the moment created by the lateral offset between the air spring and the trailing arm.

Raidel, Sr., in U.S. Pat. No. 4,465,298, issued Aug. 14, 1984, discloses another example of a trailing arm suspension in which a square axle is mounted beneath a trailing arm and the air spring is offset laterally beneath the frame. In order to counterbalance the moment created by the lateral offset relationship between the air spring and the trailing arm, Raidel uses in several embodiments a torsion roll bar similar to the Bird transverse beam and in other embodiments uses a guide between the frame and the trailing arm.

It is known to use portions of a rigid trailing arm beam as a reservoir for an air spring in a trailing arm air spring suspension. See, for example:

Pointer U.S. Pat. No. 2,742,301, issued Apr. 17, 1956;
Walker U.S. Pat. No. 2,902,291, issued Sept. 1, 1959;
Weiss U.S. Pat. No. 2,903,256, issued Sept. 8, 1959; and
Norrie U.S. Pat. No. 2,913,252, issued Nov. 17, 1959.

SUMMARY OF THE INVENTION

The invention relates to a lightweight trailing arm suspension, adapted to support a vehicle on ground engaging wheels, and having a frame bracket adapted to mount to a longitudinally-extending frame of the vehicle, a rigid trailing arm pivotably mounted to the frame bracket at one end for vertical swinging movement with respect thereto, an air spring assembly mounted to another end of the trailing arm and adapted to mount to the vehicle frame to cushion the swinging movement of the trailing arm about one end thereof and means for mounting the axle to the trailing arm. According to the invention, the air spring assembly has a cup forming a bottom portion thereof and a reservoir for the air spring. The cup is secured to a terminal end of the trailing arm in lateral juxtaposition thereto so as to form an extension thereof to reduce the length of the trailing arm and to increase the volume of the air spring without increasing the height between the frame and the axle. Preferably, the cup is secured to the trailing arm through a weld which extends substantially 360° around the terminal end of the trailing arm.

The invention is especially applicable to a trailing arm of the type wherein a rigid trailing arm has a longitudinal axis and the free end of the trailing arm extends laterally of the longitudinal axis to produce a torsional moment about the longitudinal axis. The means mounting the axle to the frame comprises an upper axle bracket and a lower axle bracket and means for clamping the upper and lower axle brackets to the axle. Rubber bushed couplings are positioned in openings in the trailing arm and between one of the upper and lower axle brackets to permit articulation between the axle brackets and the trailing arm. According to the invention, the torsional moment created by the lateral offset of the air spring is resisted by a bearing means between at least one of the upper and lower axle brackets and the trailing arm so as to resist the torsional bending moment about the longitudinal axis of the trailing arm. Preferably, the bearing means comprises a wear pad which is removably mounted to the upper axle bracket for ease of replacement. In this manner, the wear pad can be easily replaced when worn. Wear on the trailing arm and the axle brackets is thus minimized.

The rubber bushed couplings are positioned forward and rearward of the axle and have ends which extend outwardly of either side of the trailing arm. Further, one of the upper and lower axle brackets has supporting means for supporting each of the coupling ends. Bolts extend through the coupling ends and the supporting means to clamp the brackets to the axle. At least one of the coupling ends is eccentric with respect to a central axis through the bushings to facilitate adjustment f the pinion angle of the axle. Further, one of the supporting means is preferably offset vertically to further facilitate adjustment of the pinion angle of the axle. Shims are positioned between one of the coupling ends and one of the support means to adjust the pinion angle of the axle.

The invention is preferably applied to those trailing arm suspensions in which the trailing arm extends first horizontally, then downwardly and then horizontally between the one end and the other end and the axle mounting means is mounted beneath the first laterally-extending portion.

A flexible strap, preferably of a Kevlar or Nylon material, is mounted at one end to the trailing arm and is adapted to be mounted at another end to the vehicle frame to limit the movement of the trailing arm from the frame. Stop means are further provided to limit the movement of the frame towards the trailing arm. The stop means is adapted to be mounted to the vehicle frame above the axle so that the stop means contacts an axle bracket when the axle comes within a predetermined distance from the frame. In this manner, a stop member is avoided between the frame and the air spring assembly to reduce any sharp impacts on the weld between the air spring assembly and the trailing arm.

BRIEF DESCRIPTION OF THE DRAWINGS

The invention will now be described with reference to the accompanying drawings, in which.

DESCRIPTION OF THE PREFERRED EMBODIMENT

Figure 1:
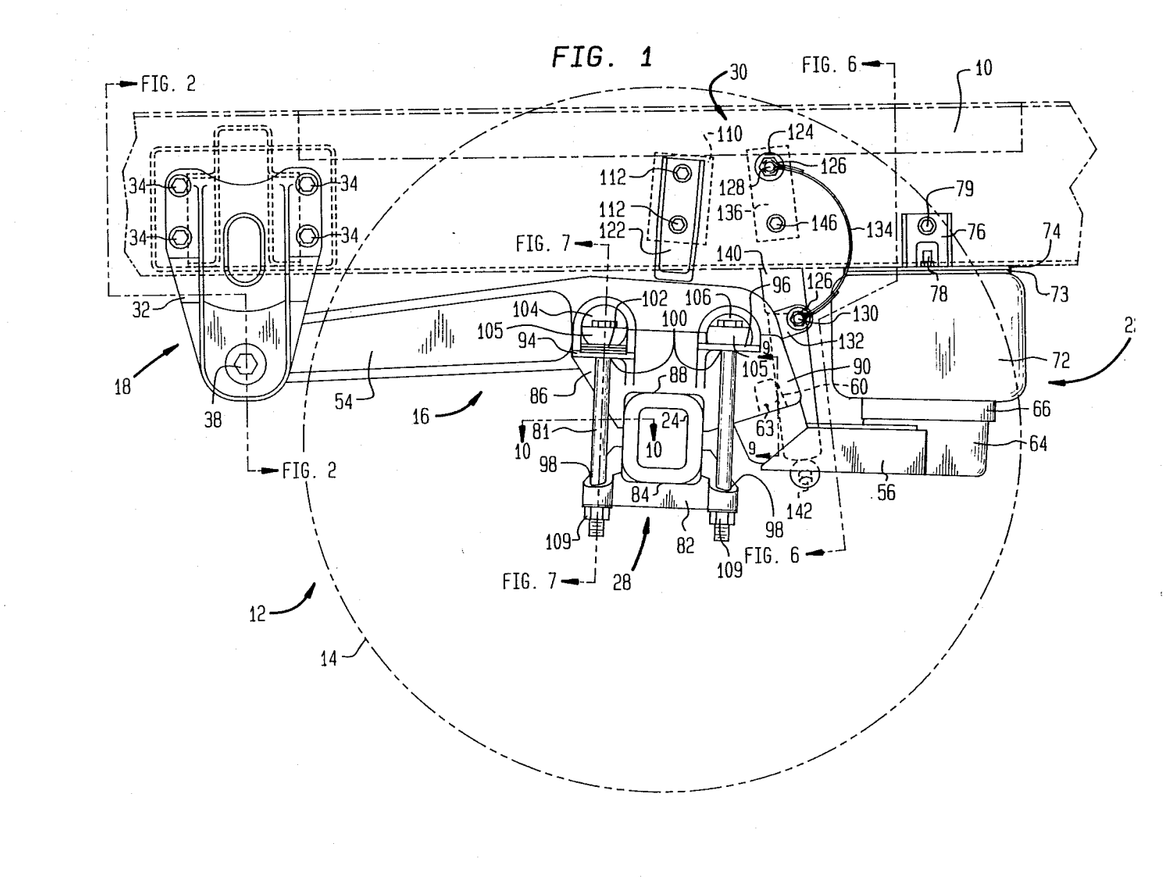
FIG. 1 is a side elevational view of a suspension system according to the invention, shown mounted on a portion of a frame of a vehicle.

Referring now to the drawings and to FIG. 1 in particular, there is shown a portion of a vehicle frame 10 with the front of the vehicle to the left as illustrated in the drawing. A suspension system generally shown as 12 mounts the frame to ground engaging wheels 14. The suspension system 12 is formed from a trailing arm 16 which is pivotably mounted to a frame bracket assembly 18. The trailing arm 16 mounts an air spring assembly 22, the upper portion of which is secured to the frame 10 so as to cushion the upward and downward movement of the frame with respect to the axle 24. A clamping assembly 28 clamps the axle 24 to the trailing arm 16. The wheels 14 are mounted to the axle 24 A stop assembly 30 is mounted between the frame 10 and the suspension system 12 to limit the upward and downward movement of the frame 10 with respect to the axle 24.

Figure 2:
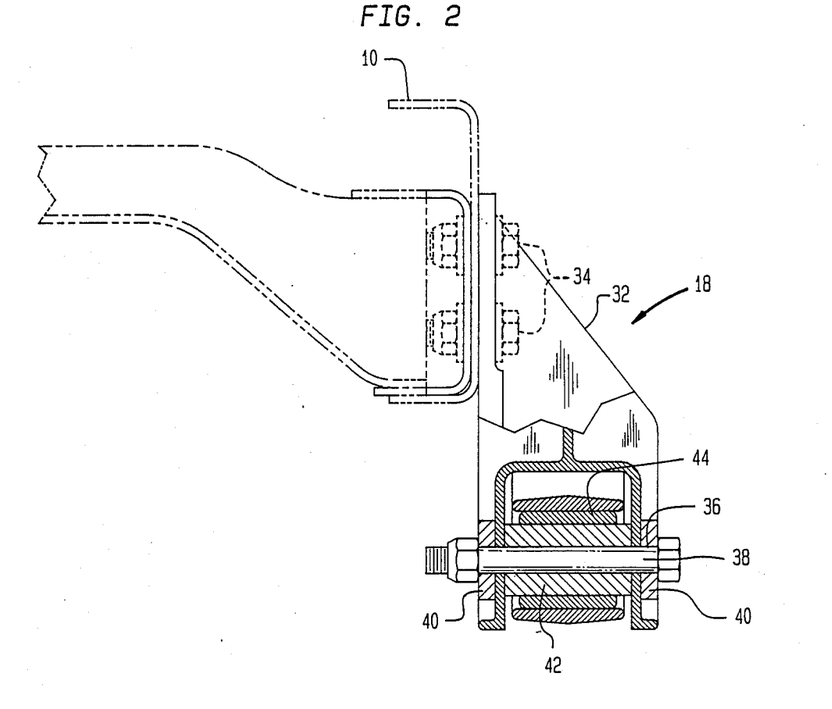
FIG. 2 is an end view seen along line 2—2 of FIG. 1.
Figure 5:
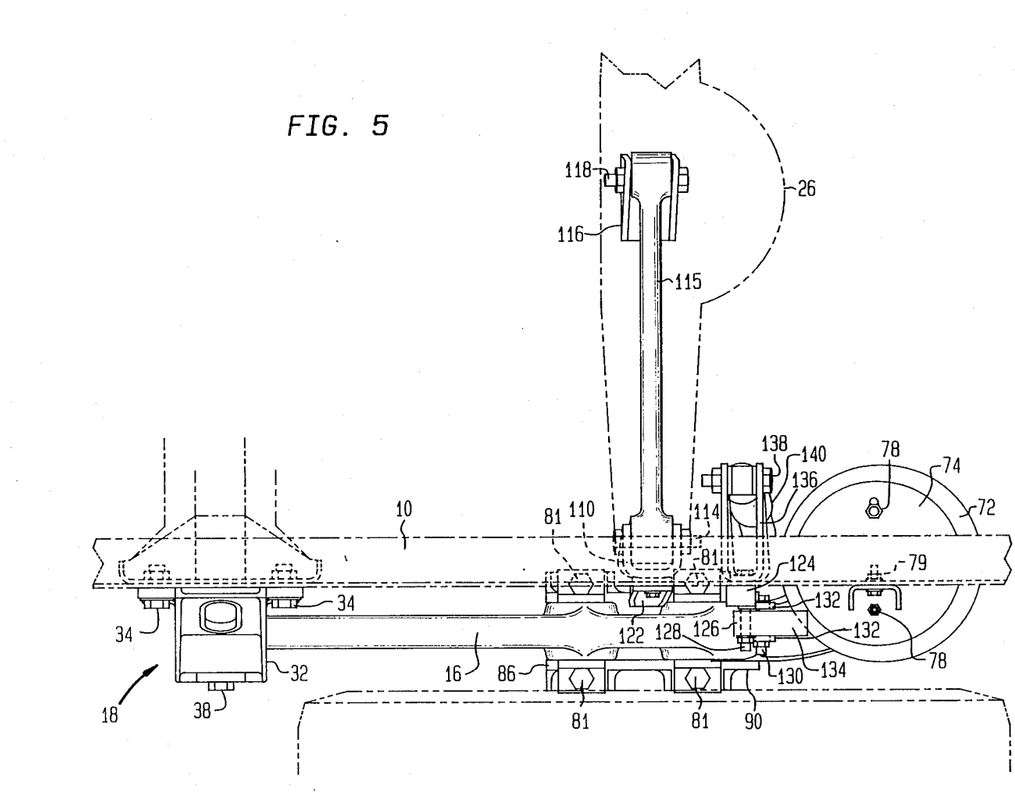
FIG. 5 is a plan view of the suspension system shown in FIG. 1.

The frame bracket assembly 18 is shown in FIGS. 1, 2 and 5 and comprises a frame bracket 32 mounted to the side of frame 10 through bolts 34. The frame bracket 32 projects laterally outwardly of the side of the frame 10 into alignment with the horizontal space between the frame 10 and the ground-engaging wheel 14. The frame bracket 32 has an elongated opening 36 in each of two depending arms through which a bolt 38 passes. The openings are elongated in the direction of the axis of the vehicle so as to permit the bolt 38 to shift forwardly or rearwardly with respect to the frame bracket 32. An adjustment plate 40 is provided on each end of the bolt 38 and in juxtaposition to the outside surfaces of the frame bracket 32. Preferably, the frame bracket and adjustment plates 40 have interengaging serrations for a gripping adjustment as disclosed and claimed in U.S. Pat. No. 4,595,216, issued June 16, 1986, which is incorporated herein by reference.

Figure 3:
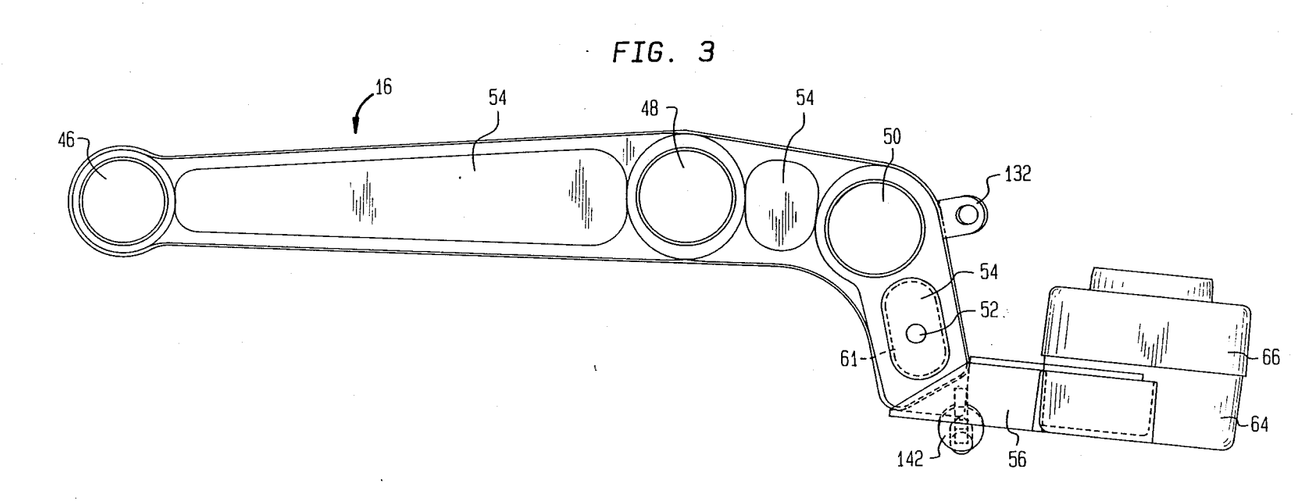
FIG. 3 is a side elevational view of a trailing arm and air spring support subassembly shown in FIG. 1.
Figure 4:
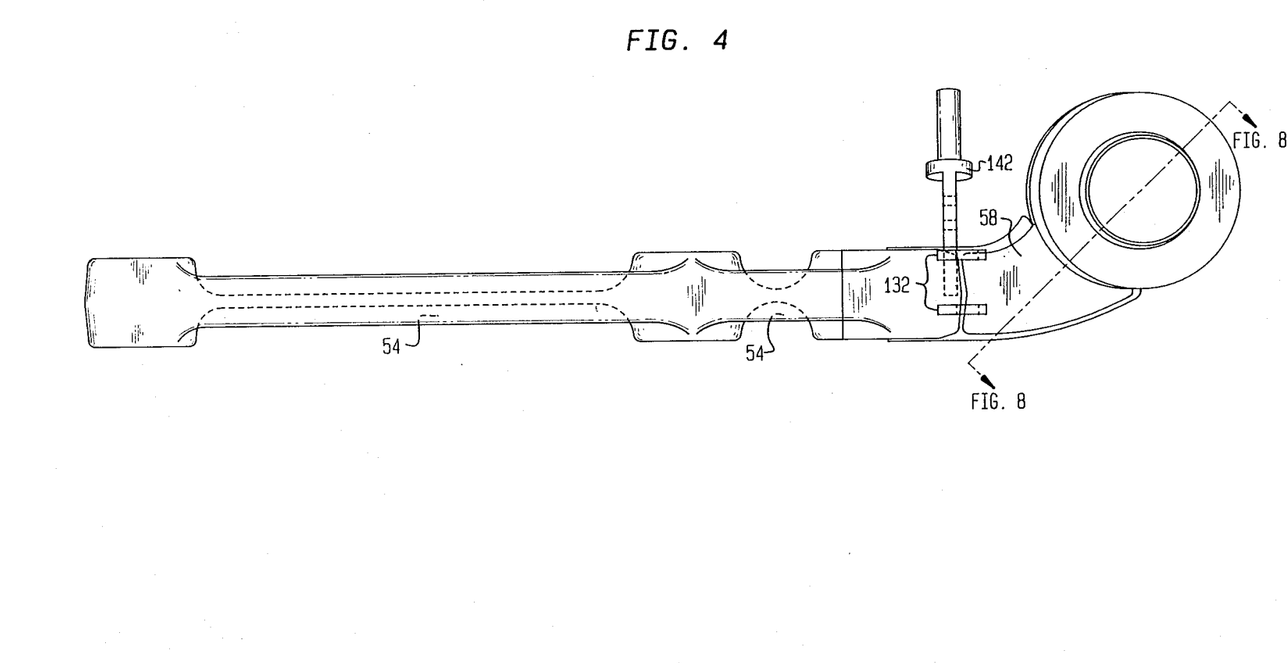
FIG. 4 is a plan elevational view of the trailing arm and air spring support subassembly shown in FIG. 3.

The trailing arm 16 as shown in FIGS. 3 and 4 comprises a forged I-beam portion 54 with several longitudinal openings 46, 48, 50 and 52. An opening 46 at one end of trailing arm 16 mounts a rubber bushing 44 and receives the bolt 38 to pivotably mount the trailing arm 16 to the frame bracket assembly 18. The trailing arm 16 is pivotably mounted to the frame bracket 32 for pivotable movement with respect thereto through an inner sleeve bushing 42, and rubber bushing 44. The inner sleeve bushing 42 abuts against the interior of the depending arms of the frame bracket 32 so that the tightening of the bolt 38 will clamp the inner sleeve bushing 42 tightly within the frame bracket 32. On the other hand, the rubber bushing 44 has a length less than the length of the inner sleeve bushing 42 and thus is rotatable with respect to the inner sleeve 42. In practice, the rubber bushing 44 provides articulation of the trailing arm 16 about the bolt 38 in a torsional sense as well as in a linear sense. In other words, the trailing arm 16 can pivotably articulate about the axis of bolt 38 as well as about an axis perpendicular to the axis of bolt 38.

Figure 11:
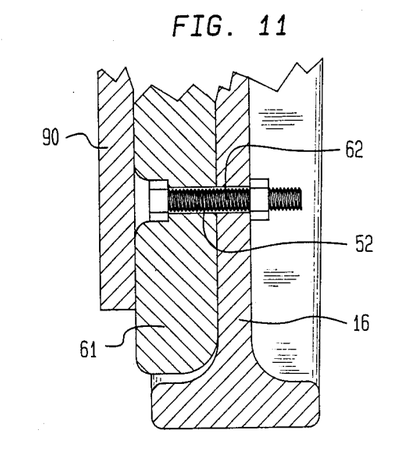
FIG. 11 is an alternative embodiment of a removable wear pad from the same view as FIG. 9.

A trailing arm terminal end 56 is rigidly secured, by welding, to the I-beam portion 54 and is curved laterally from the longitudinal axis of the I-beam portion 54 to position the air spring assembly 22 beneath the frame 10. A top mounting plate 58 is affixed to the open top of the trailing arm terminal end 56 to provide a rigid hollow structure which is strong but light in weight. Preferably, the top mounting plate 58 and the trailing arm terminal end 56 are cast in one integral piece. A bolt opening 52 in the I-beam portion 54 provides for removeable attachment of a wear block 59 for a point of contact with a wear pad 60, as hereinafter described. In an alternative embodiment, a wear pad 61 can be attached to the I-beam portion 54 by the use of a bolt 62 through bolt opening 52 as shown in FIG. 11.

Figure 8:
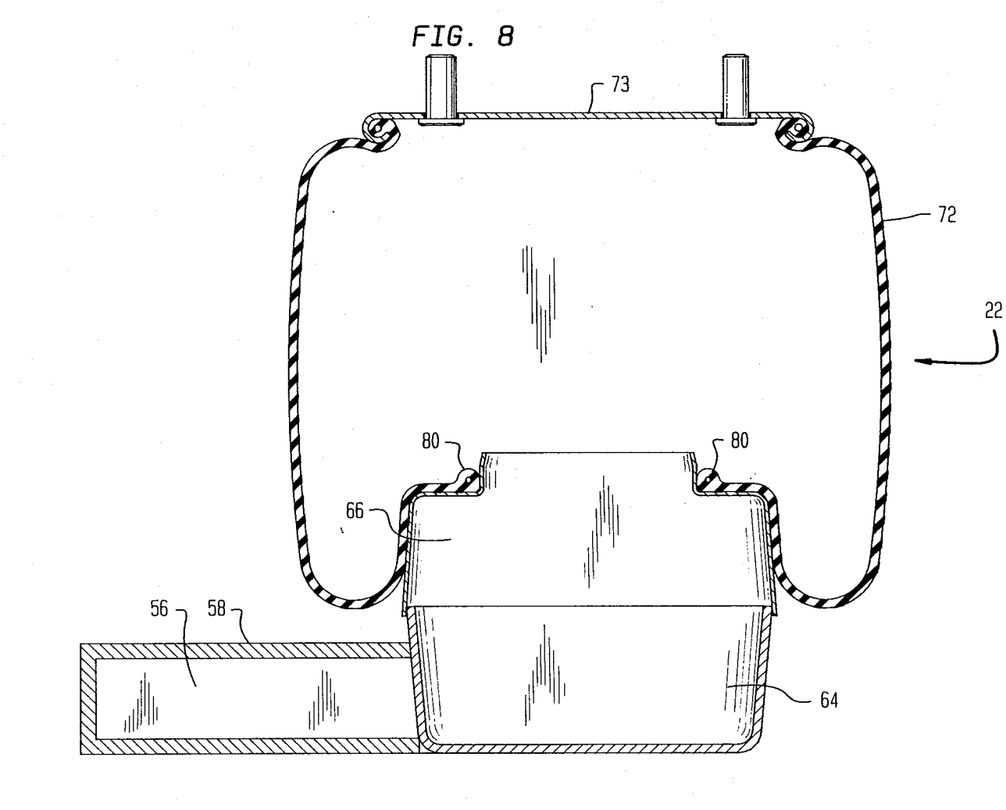
FIG. 8 is a sectional view taken along line 8—8 of FIG. 4.

The air spring assembly 22 (as shown in FIGS. 1 and 8) comprises a cup 64, a movable piston 66, an air spring 72, and an air spring top cover 73. The air spring 72 is mounted at a lower portion to the piston 66 by a self sealing bead 80 and is mounted at an upper portion in conventional fashion to the air spring top cover 73. The air spring top cover 73 attaches to a mounting plate 74 and the mounting plate 74 in turn is mounted to the frame 10 through a mounting bracket 76 and bolts 78, 79.

The cup 64 is rigidly secured to the trailing arm end 56 and the top mounting plate 58 by welding, for example. The weld extends 360° around the beam end to firmly secure the cup 64 to the beam end 56, such that the air spring assembly 22 becomes an integral part of the trailing arm 16. The piston 66 is hollow and contiguous and mounts the cup 64 in open communication such that the piston 66 and the cup 64 together form a reservoir for the air spring 72.

Figure 10:
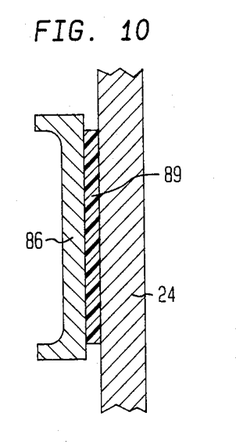
FIG. 10 is a sectional view taken along line 10—10 of FIG. 1.

The clamping assembly 28, (FIGS. 1 and 7) comprises a lower axle clamp 82 and an upper axle clamp 86 held together about the axle 24 by four long clamping bolts 81. The lower axle clamp 82 comprises a saddle shaped casting with a channel 84 having a shape generally complementary to that of the axle 24. Likewise, the upper axle clamp 86 comprises a saddle shaped casting having an upper channel 88 with a shape generally complementary to that of the axle 24. As seen in FIG. 1, the axle is square in cross-sectional configuration and the radius of curvature of the axle at the corners is slightly greater than the radius of curvature of the inside corners of the channels 84 and 88 to provide a secure four-line contact between the axle 24 and the channels 84 and 88. The channels provide secure clamping of the axle 24 between the lower axle clamp 82 and the upper axle clamp 86. Preferably, crushable plastic inserts 89 are interposed between channels 84, 88 and the axle 24 to assure secure clamping (see FIG. 10). In this case, the crushable plastic insert 89 is positioned within a recess on a channel (84 or 88) of axle clamp (82 or 84) and extends substantially across the channels 84 and 88. The axle 24 is sized to crush the plastic to form a secure and conforming fit between the plastic and the axle. An example of a suitable crushable plastic is sold by LNP Engineering Plastics, Inc. under the designation YL-4530. Also extending upwardly from the saddle portion of the upper axle clamp 86 are an upper exterior side plate 90 and an upper interior side plate 92. The upper axle clamp 86 has a forward bracket 94 on each side plate and a rearward bracket 96 on each side plate, laterally disposed such that the trailing arm 16 is nested between the exterior side plate 90 and the interior side plate 92 with the forward bushing core opening 48 of the trailing arm 16 longitudinally aligned with the forward brackets 94 and the rearward bushing core opening 50 of the trailing arm aligned with the rearward brackets 96. A forward bushing core 104 with end portions 105 is disposed in the forward bushing core opening 48 with openings 107 therein aligned with the upper axle clamp openings 100 in the forward brackets 94. Likewise a rearward bushing core 106 with end portions 105 is disposed in the rearward bushing core opening 50 with openings 107 therein aligned with the upper axle clamp openings 100 in the rearward brackets 96. Rubber bushings 108 are disposed between each bushing core 104, 106 and each bushing core opening 48, 50 to comprise a preferred embodiment of rubber bushed couplings between the upper axle clamp 86 and the trailing arm 16. A clamping bolt 81 extends through each upper axle clamp opening 100, and the aligned opening 107 in each bushing core to an aligned lower axle clamp opening 98 in the lower axle clamp 82 and secured with nuts 109 to anchor the bolts 81. The trailing arm 16 is thus clamped rigidly to the axle 24 but can still articulate about an axis perpendicular to the axes of the forward and rearward bushing cores 104, 106.

Figure 7:
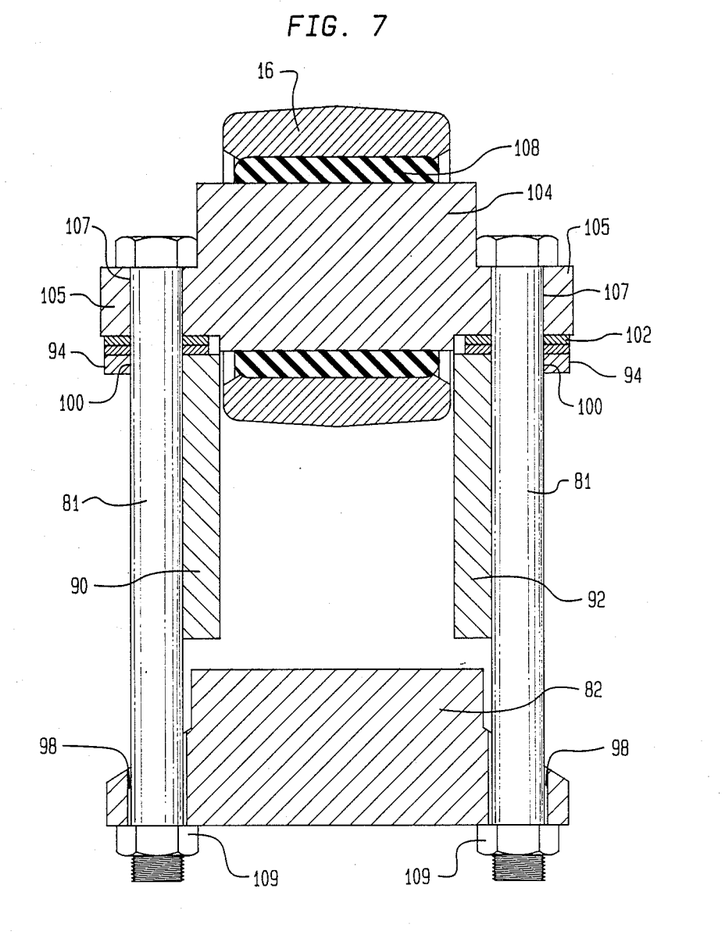
FIG. 7 is an enlarged sectional view taken along line 7—7 of FIG. 1.

Shims 102 may be inserted between the forward bushing core 104 and the forward brackets 94 to provide fine adjustment of the pinion angle of the axle 24. Adding shims 102 will increase the pinion angle and removing shims 102 will decrease the pinion angle.

As seen in FIG. 1, the forward bracket 94 is positioned slightly lower on the upper axle clamp 86 than rearward bracket 96. This relative difference in heights of the brackets 94 and 96 provides space for positioning of the shims 102 for the pinion axle adjustment.

It will also be seen in FIG. 1 that the ends of the forward and rearward bushing cores 104 and 106, respectively, are shaped differently. The end 105 of forward core 104 is eccentric and the end 105 of rearward core 106 is concentric such that a lower surface of the end 105 of forward core 104 is substantially farther beneath the centerline of the core than is the lower surface of the end 105 of rearward core 106. Although not shown, the opposite ends of cores 104 and 106 would be identical to the ends shown. These differential locations of the core end lower surfaces further facilitate adjustment of the pinion angle. With the core configuration shown in FIG. 1, the pinion angle adjustment can range between 0° and 6°. If another forward core 104 is substituted for the rearward core 106, the pinion angle adjustment can range between 6° and 13°.

Figure 9:
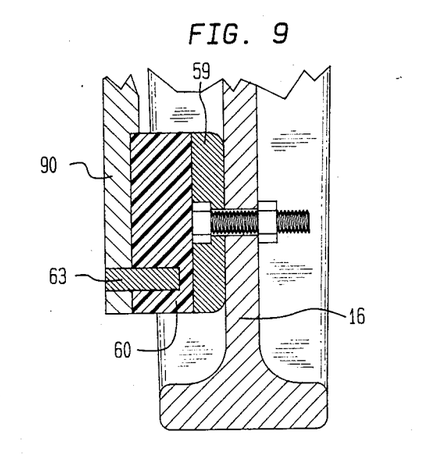
FIG. 9 is a sectional view taken along line 9—9 of FIG. 1.

Wear pad 60 is affixed to a recess in the upper exterior side plate 90 in juxtaposition with wear block 59 by removable clips 63 (see FIGS. 1 and 9). The wear pad 60 is replaceable by simply removing the clips 63 from the outside of the upper exterior side plate 90 and sliding the wear pad out of the upper axle clamp 86 without having to remove the trailing arm 16 or the clamp 86. A new wear pad 60 can simply be positioned in the clamp 86 and secured there by clips 63. The wear pad 60 is preferably made of relatively soft low friction plastic, such as polyethylene, polypropylene, Nylon. A specific example of a plastic is RAL-4023 sold by LNP Engineering Plastics, Inc., to absorb abrasions as will be described hereinafter. The wear block 59 is preferably made of a relatively low-friction, soft metal such as ductile iron. Alternatively, the wear pad 60 can also be made out of a similar low-friction, soft metal. In the alternative embodiment as shown in FIG. 11, wear pad 61 can be made of similar materials such as plastic or ductile iron.

Figure 6:
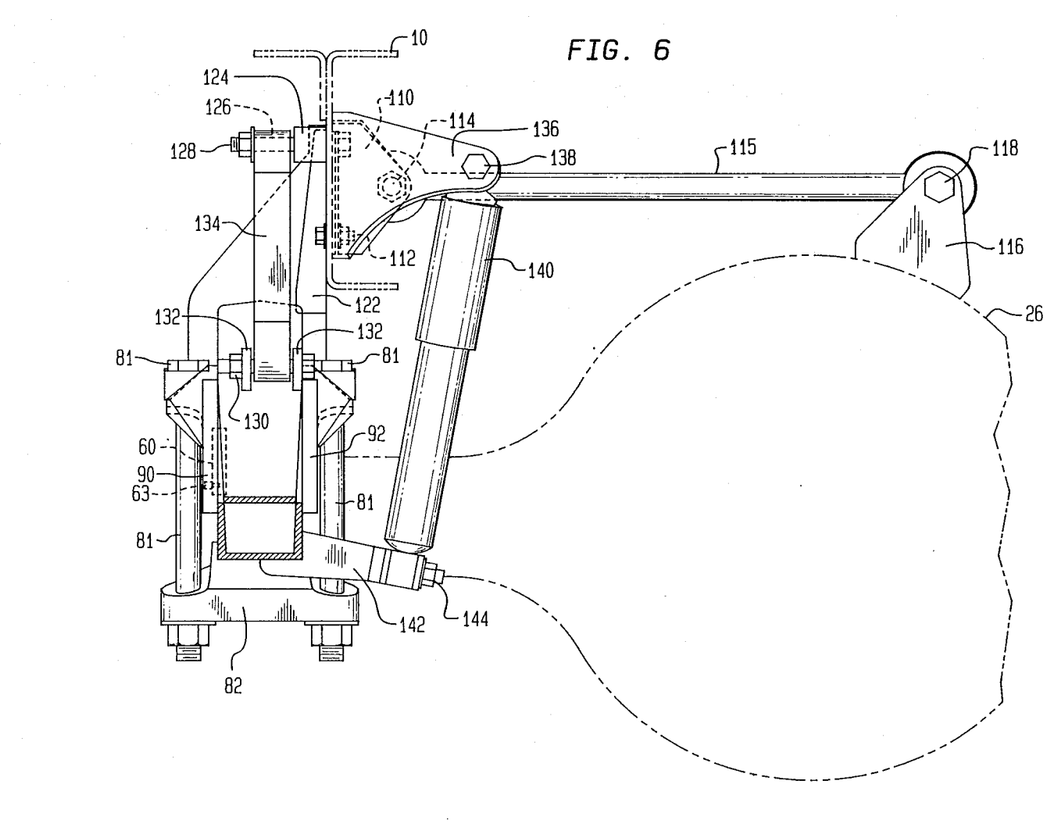
FIG. 6 is a sectional view taken along line 6—6 of FIG. 1.

As shown in FIGS. 1, 5 and 6, a track bar 115 with two longitudinal openings at each end is mounted between two U-shaped brackets, a frame mounting bracket 110 and an axle mounting bracket 116 such that the transverse axis of the track bar is aligned with the centerline of axle 24. The frame mounting bracket 110 is affixed to the frame 10 with mounting bolts 112, and with the track bar 115 mounted thereon with a bushed bolt 114 such that the track bar is free to rotate about an axis generally parallel to the direction of the vehicle. The other end of the track bar is mounted through a bushed bolt 118 to the axle mounting bracket 116 which is mounted to the axle housing 26 by welding, for example.

The stop assembly 30 comprises a strap 134, preferably of a Kevlar material, mounted at the upper end to the frame 10 and at the lower end to the trailing arm 16. At the frame, long bolt 128 secures a sleeve 126 around which the strap 134 is secured, with a boss 124 for spacing and for alignment. At the trailing arm 16, a pair of ears 132 extend from the trailing arm 16 with holes to which the bolt 130, sleeve 126, and the other end of the strap 134 are attached. The stop assembly 30 further comprises an axle stop 122 mounted to the frame with bolts 112. Thus, the downward movement of the axle with respect to the frame is limited by the strap 134 and the upward movement of the axle with respect to the frame is limited by the axle stop 122.

A shock absorber can be provided between the frame 10 and the trailing arm 16. To this end, an upper shock bracket 136 is mounted to the frame 10 through the bolts 128 and 146. A bolt 138 mounts a shock absorber 140 at an upper portion thereof to the upper shock bracket 136. In like manner, the lower portion of the shock absorber 140 is mounted to the trailing arm 16 through a lower shock bracket 142 and a stud 144.

In operation, a vehicle mounted on frame 10 is supported on the wheels 14 through the suspension system 12 and the axle 24. On either side of the vehicle, support is provided at the forward end through the trailing arm 16 and the frame bracket assembly 18 and at the rear end through the air spring assembly 22. As the wheels hit bumps, the axle 24 will move upwardly and downwardly with respect to the frame 10. As this movement occurs, the trailing arm 16 will pivot about the bolt 38 against the pressure in the air spring 72. The upward extent of movement of the frame 10 with respect to the axle 24, is limited by the strap 134 and the downward movement of the frame 10 with respect to the axle 24 is limited by contact of the axle stop 122 with the axle bracket 86. As the suspension system moves up and down, the axle is prevented from moving laterally by the track bar 115. Because the air spring assembly 22 is laterally off-set with respect to the longitudinal axis of the trailing arm 16, there will be a torsional moment in a clockwise direction as viewed in FIG. 6 about the longitudinal axis of the trailing arm 16. This torsional moment is resisted and opposed by forces exerted by the wear pad 60 in juxtaposition to the upper exterior side plate 90. Since the wear pad 60 is easily removable and replaceable from the upper exterior side plate 90 of upper axle clamp 86, the suspension can be conveniently maintained.

When the vehicle mounted on frame 10 is moving straight ahead and wheels 14 at opposite sides of the vehicle roll over similar surfaces, there is no significant differential movement between a pair of trailing arms 16 on each side of the vehicle frame. Assume now that the vehicle is encountering road conditions which cause differential vertical swinging movement of the trailing arms 16. This condition occurs when the vehicle rounds a curve so that it tends to lean to one side. It also occurs when one wheel 14 traverses a bump or depression while the other wheel passes over an unlike surface. Such differential vertical swinging movement of the trailing arms causes the track bar 115 to rotate freely about its longitudinal axis.

The differential swinging movement of the trailing arms 16 also tends to stress the axle 24 and axle housing 26 in torsion and the axle also resists such differential swinging. The rubber bushed couplings comprising rubber bushings 108 in the forward and rearward bushing cores 104 and 106 of the clamping assembly 28 strongly resist forces tending to stress axle 24 in torsion but yield slightly thereto to facilitate a limited amount of articulation of the clamping assemblies 28. This limited amount of articulation results in relative movement between the trailing arm 16 and the upper axle clamp 86. The major point of contact between the trailing arm 16 and the upper axle clamp 86 is the wear pad 60. Thus, the frictional contact between these two parts is provided by the replaceable wear pad 60. The pad 60 is softer than the wear block 59 and thus wears without any significant wear in the wear block 59. The slight articulation of the clamping assembly 28 and the pivotal mounting at the frame bracket assembly 18 facilitated by rubber bushings 44 and 108, and complemented by replaceable wear pads 60, greatly diminish fatigue, wear and breakage of the metal components of the suspension and commensurately increases the life of the suspension. Under many conditions of highway travel, the forces discussed above will all be acting on the suspension at the same time to a greater or lesser extent.

The upper axle clamp 86 provides a convenient and easy way to adjust the pinion angle of the axle over a relatively large range depending on the needs of the customer.

The use of the air spring cup 64 as a part of the trailing arm and as a part of the air spring support assembly reduces the weight of the suspension and improves the ride without sacrificing height between the frame 10 and the axle 24. Because the structural portion of the trailing arm does not extend beneath the air spring assembly 22, weight and material costs are saved with a shorter structural beam. The volume provided by the cup 64 increases the volume of the air spring assembly 22 and thus makes the ride smoother. Without the cup 64, the height of the air spring 72 would have to be increased in order to provide the volume achieved with cup 64. Increasing the height of the air spring would undesirably increase the height of the frame 10 with respect to the axle 24.

The following chart shows a comparison between the spring rates of the air spring according to the invention with and without the cup 64. In one series of measurements, the cup was filled with water to reduce the volume of air in the air spring assembly as would be the case if the cup were not present. For another series of measurements, the cup was free of water and in open communication with the air spring as embodied in the invention. In the particular air spring constructed, the cup 64 and piston 66 had a volume of 240 cubic inches. The total air spring volume was 780 cubic inches. The data clearly show a lower spring rate with the cup, thus indicating that the increased volume of air makes the ride smoother.

| Load (lbs.) | Spring Rate (lbs./in.) | |
|---|---|---|
| | with cup 64 | Without cup 64 |
| 6,000 | 840 | 1150 |
| 4,600 | 700 | 940 |
| 3,300 | 520 | 670 |
| 2,100 | 360 | 500 |

The invention provides a simple and lightweight air suspension system for a vehicle axle. The suspension is flexible, is articulatable, yet is strong.

Reasonable variation and modification are possible within the scope of the foregoing disclosure and drawings without departing from the spirit of the invention.

The embodiments of the invention in which an exclusive property or privilege is claimed are defined as follows:

1. In a trailing arm suspension adapted to support a vehicle on ground-engaging wheels, the vehicle having a longitudally-extending frame, the trailing arm suspension comprising:
   a frame bracket adapted to mount to a vehicle frame;
   a rigid trailing arm pivotably mounted to the frame bracket at one end for vertical swinging movement with respect thereto;
   an air spring assembly mounted to another end of said trailing arm and adapted to mount to the vehicle frame to cushion the swinging movement of the trailing arm about the one end thereof; and
   means for mounting an axle to said trailing arm,
   the improvement which comprises:
   said air spring assembly having a cup forming a bottom portion thereof and a reservoir for said air spring, said cup being secured to a terminal end of said trailing arm in lateral juxtaposition thereto so as to form an extension thereof to reduce the length of said trailing arm and to increase the volume of said air spring without increasing the height between said frame and said axle.

2. A trailing arm suspension according to claim 1 wherein said cup is secured to said trailing arm through a weld which extends substantially 360 degrees around said terminal end of said trailing arm.

3. A trailing arm suspension according to claim 1 wherein said rigid trailing arm has a longitudinal axis and said other end thereof extends laterally of said longitudinal axis to thereby produce a torsional moment about said longitudinal axis;

said means mounting an axle to said frame comprises an upper axle clamp and a lower axle clamp, means for clamping said upper and lower axle clamps to said axle, and a rubber bushed coupling between on of said upper and lower axle clamps and said trailing arm to permit articulation between said axle clamps and said trailing arm; and bearing means between at least one of said upper and lower axle clamps and said trailing arm and positioned to resist the torsional bending moment about said longitudinal axis resulting from said laterally extending other end of said rigid trailing arm.

4. A trailing arm suspension according to claim 3 wherein said bearing means comprises a wear pad and means removably mounting said wear pad to one of said one axle clamp and said rigid trailing arm for ease of replacement, whereby said wear pad can be easily replaced when worn and wear on said trailing arm and said upper and lower axle clamps is minimized.

5. A trailing arm suspension according to claim 3 wherein said rubber bushed couplings are positioned forward and rearward of said axle and have ends which extend outwardly of either side of said trailing arm, one of said upper and lower axle clamps having supporting means supporting each of said coupling ends, and bolts extending through said coupling ends and said supporting means to secure said clamps to said axle; and at least one of said coupling ends is eccentric with respect to a central axis through said bushings to facilitate adjustment of a pinion angle of said axle.

6. A trailing arm suspension according to claim 5 wherein one of said supporting means is offset vertically to further facilitate adjustment of the pinion angle of said axle.

7. A trailing arm suspension according to claim 6 wherein shims are positioned between one of said coupling ends and one of said support means for adjustment of the pinion angle of said axle.

8. A trailing arm suspension according to claim 5 wherein shims are positioned between one of said coupling ends and one of said support means to adjust the pinion angle of said axle.

9. A trailing arm suspension according to claim 3 wherein said rubber bushed couplings are positioned forward and rearward of said axle and have ends which extend outwardly of either side of said trailing arm, one of said upper and lower axle clamps having supporting means supporting each of said coupling ends, and bolts extend through said coupling ends and said supporting means to secure said clamps to said axle;

one of said supporting means being offset with respect to the other to facilitate adjustment of the pinion angle of said axle.

10. A trailing arm suspension according to claim 3 wherein said trailing arm extends first horizontally, then downwardly, and then horizontally between said one end and said another end, and said axle mounting means is mounted beneath said first laterally-extending portion.

11. A trailing arm suspension according to claim 1 and further comprising a flexible strap mounted at one end to said trailing arm and adapted to be mounted at another end to said vehicle frame to limit the movement of said trailing arm from said frame.

12. A trailing arm suspension according to claim 11 and further comprising stop means adapted to be mounted to said vehicle frame above said axle to limit the movement of said frame towards said trailing arm.

13. A trailing arm suspension according to claim 1 and further comprising stop means adapted to be mounted to said frame above said axle to limit the movement of said frame towards said trailing arm.

14. In a trailing arm suspension adapted to support a vehicle on ground-engaging wheels, the vehicle having a longitudally-extending frame, the trailing arm suspension comprising:

a frame bracket adapted to mount to a vehicle frame;

a rigid trailing arm pivotably mounted to the frame bracket at one end for vertical swinging movement with respect thereto;

an air spring assembly mounted to another end of said trailing arm and adapted to mount to the vehicle frame to cushion the swinging movement of the trailing arm about the one end thereof;

said rigid trailing arm having a longitudinal axis and said other end thereof extending laterally of said longitudinal axis to thereby produce a torsional moment about said longitudinal axis;

means for counterbalancing the torsional moment created by said laterally offset air spring assembly;

means for mounting an axle to said trailing arm, said mounting means comprising an upper axle clamp and a lower axle clamp, means for securing said upper and lower axle clamps to said axle, rubber bushed couplings between one of said upper and lower axle clamps and said trailing arm to permit articulation between said axle clamps and said trailing arms;

the improvement in said means to counterbalance the torsional moment which comprises:

bearing means between at least one of said upper and lower axle clamps and said trailing arm and positioned to resist the torsional bending moment about said longitudinal axis resulting from said laterally extending air spring at the other end of said rigid trailing arm.

15. A trailing arm suspension according to claim 14 wherein said bearing means comprises a wear pad and means removably mounting said wear pad to one of said rigid trailing arm and said one axle clamp for ease of replacement, whereby said wear pad can be easily replaced when worn and wear on said trailing arm and said upper and lower axle clamps is minimized.

16. A trailing arm suspension according to claim 15 wherein said wear pad is made from a relatively low-friction plastic or metal.

17. A trailing arm suspension according to claim 16 wherein said wear pad is mounted to an inside surface of said one axle clamp through pins which are accessible for removal on an outside surface of said one axle clamp for ease of mounting and replacement of said wear pad.

18. A trailing arm suspension according to claim 14 wherein said means for securing said upper and lower axle clamps to said axle comprises a crushable plastic plate positioned between one of said upper and lower axle clamps and said axle to compensate for tolerance variations between the same.

19. A trailing arm suspension according to claim 18 wherein said axle is square in cross-sectional configuration and said crushable pad is positioned at a side of said axle.

20. A trailing arm suspension according to claim 14 wherein said axle is square in cross-sectional configuration and said axle has a radius of curvature at the corners thereof larger than a radius of curvature on an inside corner of at least one of said upper and lower axle clamps.

21. A trailing arm suspension according to claim 14 wherein said rubber bushed couplings are positioned forward and rearward of said axle and extend outwardly of either side of said trailing arm;
one of said upper and lower axle clamps has supporting means supporting each of said coupling ends and bolts extend through said coupling ends and said supporting means to secure said clamps to said axle;
at least one of said coupling ends are eccentric with respect to a central axis of said bushed couplings to facilitate adjustment of the pinion angle of said axle.

22. A trailing arm suspension according to claim 21 wherein one of said supporting means is offset vertically with respect to the other to further facilitate adjustment of the pinion angle of the axle.

23. A trailing arm suspension according to claim 14 wherein said rubber bushed couplings are positioned forward and rearward of said axle and have ends which extend outwardly of either side of said trailing arm;
one of said upper and lower axle clamps has support means for supporting each of said coupling ends, and said bolts extend through said coupling ends and said support means to secure said clamps to said axle;
one of said support means being offset vertically with respect to the other to facilitate adjustment of the pinion angle of said axle.

24. A trailing arm suspension according to claim 14 wherein said trailing arm extends first horizontally, then downwardly and then horizontally between said one end and said another end, and said axle mounting means is mounted beneath said first laterally-extending portion of said trailing arm.

25. A trailing arm suspension according to claim 24 wherein the upper axle clamp is mounted to the trailing arm and the axle is mounted beneath the trailing arm.

26. In a trailing arm suspension adapted to support a vehicle on ground-engaging wheels, the vehicle having a longitudinally-extending frame, the trailing arm suspension comprising:
a frame bracket adapted to mount to a vehicle frame;
a rigid trailing arm pivotably mounted to the frame bracket at one end for vertical swinging movement with respect thereto;
an air spring assembly mounted to another end of said trailing arm and adapted to mount to the vehicle frame to cushion the swinging movement of the trailing arm about the one end thereof;
means for mounting an axle to said trailing arm comprising an upper axle clamp and a lower axle clamp, means for securing said upper and lower axle clamps to said axle, rubber bushed couplings between one of said upper and lower axle clamps and said trailing arm to prevent articulation between said axle clamps and said trailing arm, said rubber bushed couplings are positioned forward and rearward of said axle and have ends which extend outwardly of either side of said trailing arm assembly;
one of said upper and lower axle clamps having support means supporting each of said coupling ends, and bolts extend through said coupling ends and said supporting means to secure said clamps to said axle;
the improvement which comprises:
at least one of said coupling ends is eccentric with respect to a central axis through said bushed coupling to facilitate adjustment of pinion angle of said axle.

27. A trailing arm suspension according to claim 26 wherein one of said support means is offset vertically with respect to the other to facilitate adjustment of the pinion angle of said axle.

28. A trailing arm suspension according to claim 27 wherein shims are positioned between one of said coupling ends and one of said support means to adjust the pinion angle of said axle.

29. In a trailing arm suspension adapted to support a vehicle on ground engaging wheels, the vehicle having a longitudinally extending frame, the trailing arm suspension comprising:
a frame bracket adapted to mount to a vehicle frame;
a rigid trailing arm pivotable mounted to the frame at one end for vertical swinging movement with respect thereto;
means for mounting an axle to said trailing arm comprising an upper axle clamp and lower axle clamp, means for clamping said upper and lower axle clamps to said axle, rubber bushed couplings between one of said upper and lower axle clamps and said trailing arm to permit articulation between said axle clamps and said trailing arm, said rubber bushed coupling being positioned forward and rearward of said axle and having ends which extend outwardly of either side of said trailing arm;
one of said upper and lower axle clamps having support means supporting each of said coupling ends, and bolts extending through said coupling ends at said supporting means to secure said clamps to said axle;
the improvement which comprises:
one of said support means being slightly offset vertically with respect to the other to facilitate adjustment of the pinion angle of said axle relative to said trailing arm.

30. A trailing arm suspension adapted to support a vehicle on ground-engaging wheels, the vehicle having a longitudinally-extending frame, the trailing arm suspension comprising:
a frame bracket adapted to mount to a vehicle frame;
a rigid trailing arm pivotably mounted to the frame bracket at one end for vertical swinging movement with respect thereto;
an air spring assembly mounted to another end of said trailing arm and adapted to mount to the vehicle frame to cushion the swinging movement of the trailing arm about the one end thereof;
means for mounting an axle to said trailing arm comprising an upper axle clamp, a lower axle clamp, and means for securing said upper and lower axle clamps together with the axle clamped therebetween; and
means for mounting one of the said upper and lower axle clamps to said trailing arm;
the improvement in said axle mounting means comprising a crushable plastic plate for mounting between one of said upper and lower axle clamps and said axle to compensate for tolerances between the same.

31. A trailing arm suspension according to claim 30 and further comprising an axle square in cross-sectional configuration, and wherein said crushable pad is positioned at a side of said axle and extends along a substantial width of said one upper and lower axle clamp.

32. A trailing arm suspension adapted to support a vehicle on ground-engaging wheels, the vehicle having a longitudinally-extending frame, the trailing arm suspension comprising:

a frame bracket adapted to mount to a vehicle frame;

a rigid trailing arm pivotably mounted to the frame bracket at one end for vertical swinging movement with respect thereto;

an air spring assembly mounted to another end of said trailing arm and adapted to mount to the vehicle frame to cushion the swinging movement of the trailing arm about the one end thereof;

an axle, square in cross-section;

means for mounting said axle to said trailing arm comprising an upper axle clamp, a lower axle clamp, and means for securing said upper and lower axle clamps together with the axle clamp therebetween; and means for mounting one of the said upper and lower axle clamps to said trailing arm;

the improvement in said axle mounting means comprising:

said square axle has a radius of curvature at the corners thereof larger than a radius of curvature on the inside corner of at least one of said upper and lower axle clamps to firmly wedge said axle to said at least one axle clamp.

* * * * *